United States Patent
Inoue et al.

(10) Patent No.: US 8,561,321 B2
(45) Date of Patent: *Oct. 22, 2013

(54) AIR INJECTION NOZZLE, AND TENTER OVEN USING THE NOZZLE

(75) Inventors: Hiroyuki Inoue, Shiga (JP); Takanori Nishida, Shiga (JP); Hiroyuki Aso, Shiga (JP)

(73) Assignee: Toray Industries, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/429,937

(22) Filed: Mar. 26, 2012

(65) Prior Publication Data

US 2012/0210599 A1   Aug. 23, 2012

Related U.S. Application Data

(62) Division of application No. 12/529,972, filed as application No. PCT/JP2008/053409 on Feb. 27, 2008, now Pat. No. 8,220,180.

(30) Foreign Application Priority Data

Mar. 20, 2007   (JP) ................................ 2007-072385

(51) Int. Cl.
*F26B 13/00*   (2006.01)

(52) U.S. Cl.
USPC .................... 34/638; 34/639; 34/643; 34/654

(58) Field of Classification Search
USPC ...................... 34/638, 639, 643, 654; 264/235
See application file for complete search history.

(56) References Cited

U.S. PATENT DOCUMENTS 5,636,454 A * 6/1997 Shida .............................. 34/643
5,699,625 A   12/1997 Iguchi
8,220,180 B2 * 7/2012 Inoue et al. ..................... 34/638

FOREIGN PATENT DOCUMENTS

| JP | 5-16758 U | 3/1993 |
| JP | 5-96619 A | 4/1993 |
| JP | 7-329153 A | 12/1995 |
| JP | 11-342535 A | 12/1999 |

* cited by examiner

*Primary Examiner* — Jiping Lu
(74) *Attorney, Agent, or Firm* — Birch, Stewart, Kolasch & Birch, LLP

(57) ABSTRACT

An air injection nozzle has an air injection face with a number of air injection holes arrayed at an interval ($P_y$) in first and second staggered rows. The first row and the second rows are positioned at an interval ($P_x$). The air injection face and the sheet running face confront each other at a distance (L). The air injection holes in the air injection face have a diameter (D). The interval ($P_x$), the interval ($P_y$), the distance (L) and the diameter (D) satisfy Formula (1): $6 \leq (L/D)/(P_x/P_y) \leq 9$, and Formula (2): $4 \leq L/D \leq 8$. This air injection nozzle is employed as a resin film heat treating apparatus in a tenter oven to be used for manufacturing the resin film.

12 Claims, 6 Drawing Sheets

US 8,561,321 B2

AIR INJECTION NOZZLE, AND TENTER OVEN USING THE NOZZLE

CROSS REFERENCE WITH PCT APP

The present application is a 37 C.F.R. §1.53(b) divisional of, and claims priority to, U.S. application Ser. No. 12/529,972, filed Sep. 4, 2009 now U.S. Pat. No. 8,220,180. Application Ser. No. 12/529,972 is the national phase under 35 U.S.C. §371 of International Application No. PCT/JP2008/053409, filed on Feb. 27, 2008. Priority is also claimed to Japanese Application No. 2007-072385 filed on Mar. 20, 2007. The entire contents of each of these applications is hereby incorporated by reference.

TECHNICAL FIELD

The present invention relates to an air ejection nozzle used for heating, cooling or heat-retaining a resin film and a tenter oven using the same.

BACKGROUND ART

Known methods for producing a biaxially oriented resin film such as a biaxially oriented polyester film include a sequential biaxial stretching method comprising the steps of continuously discharging a flowable resin from a die as a sheet, cooling and solidifying the discharged sheet on a casting drum, to form a cast film, stretching the formed cast film in the carrying direction of the film, namely, in the machine direction using a longitudinal stretching machine and subsequently stretching the film stretched in the machine direction (monoaxially oriented film) in the width direction of the film (transverse direction) in a tenter oven, and a simultaneous biaxial stretching method of stretching the cast film in the carrying direction of the film (machine direction) and in the width direction of the film (transverse direction) in a tenter oven.

In the tenter oven used for these production methods, installed are air ejection nozzles having many air ejection holes formed in the surfaces thereof to face a surface of a resin film passing through the tenter oven. Usually, multiple air ejection nozzles are installed at regular intervals in the resin film carrying direction in such a manner that the longitudinal direction of the air ejection nozzles is kept perpendicular to the resin film carrying direction.

The air ejection nozzles are provided in a nozzle housing. The nozzle housing has an air supply passage therein and has an air ejection face as one of the surfaces thereof. The ends on one side of the many air ejection holes are opened in the air ejection face, and the ends on the other side are opened into the air supply passage. To another surface or other two surfaces of the nozzle housing, an air supply duct is connected, and one end of the air supply duct communicates with the air supply passage in the nozzle housing while the other end is connected with a heat exchanger and a fan. The air controlled to a desired temperature by the heat exchanger is sent by the fan to the respective air ejection holes through the air supply duct and the air supply passage in the nozzle housing, and is ejected toward the surface of the resin film from the respective air ejection holes open in the air ejection face of the housing. The ejected air is usually collected from suction ports formed in the tenter oven, to be reused.

In general, the tenter oven has multiple divisional zones such as a preheating zone, stretching zone, heat setting zone and cooling zone in the resin film carrying direction. The tenter oven has such a structure that the temperatures of the air used in the respective zones can be set independently for the respective zones. The tenter oven is provided with numerous clips outside both the edges of the resin film for holding the edges of the resin film moving along rails from the inlet portion toward the outlet portion of the tenter oven.

In the tenter oven, the resin film held at both the edges thereof and carried by the clips is heated in the preheating zone to a temperature suitable for stretching, and stretched at least in the transverse direction in the stretching zone, then being heat-treated in the heat setting zone, cooling zone, etc. The air ejection nozzles are used to eject the air controlled at a desired temperature toward the surface of the resin film, for promoting the heat exchange between the air and the resin film, to thereby heat, cool or heat-retain the resin film.

The properties of the resin film produced like this are affected by the heat history which the resin film encounters while it passes through the respective zones of the tenter oven. Therefore, to obtain a resin film having uniform properties in the width direction of the resin film, it is important that the heat exchange between the air ejected from the air ejection nozzles and the resin film takes place uniformly in the width direction of the resin film. For this purpose, the air ejection nozzles are required to assure that the temperature of the air striking the resin film is uniform in the width direction of the resin film and that the heat transfer efficiency of the air ejection nozzles is uniform in the width direction of the resin film.

An air ejection nozzle having a continuous air ejection hole formed in the width direction of the resin film on the surface thereof facing the surface of the resin film is called a slit nozzle. As a conventional slit nozzle for the purpose of keeping the ejection velocity and temperature of air uniform in the width direction of the resin film, a nozzle having a duct of countercurrent flow design is proposed (see Patent Literature 1). However, a slit nozzle has a problem that the air jet is liable to bend in the progress direction. If the air jet bends in the progress direction, air masses different in temperature are mixed at a portion where zones different in set temperature contact each other, and large temperature irregularity can occur in the width direction of the resin film. In this case, it is difficult to obtain a resin film having uniform properties in the width direction.

According to the finding by the present inventors, the abovementioned problem that the air jet is liable to bend in the progress direction can be improved by arranging air ejection holes discretely in the width direction of the resin film, that is, by arranging many air ejection holes independent of each other at regular intervals. The reason is considered to be that the air jets finely divided in the width direction of the resin film form air passing portions between the respectively adjacent air jets, such that the air existing in the front and back of the air ejection nozzle can be guided to pass through the air passing portions, to ease the difference of the pressures in the front and back of the air ejection nozzle. As such an air ejection nozzle, there is a hole nozzle having many circular air ejection holes in the face thereof facing the surface of the resin film. However, if many air ejection holes are arranged at regular intervals in the width direction of the resin film, the heat transfer rate of the surface of the resin film becomes uneven in the width direction of the resin film, to raise a problem that the uniformity of heat transfer efficiency declines.

Proposed is a conventional hole nozzle for the purpose of enhancing the heat transfer rate of the surface of the resin film, in which while the distance between the air ejection holes and the surface of the resin film is set at 4 to 6 times the diameter of the air injection holes, many such air ejection holes are arranged zigzag in six rows in the direction perpendicular to the resin film carrying direction (see Patent Literature 2). However, the magnitude of heat transfer rate and the uniformity of heat transfer efficiency in the width direction of the resin film are different problems, and it is difficult to improve the uniformity of heat transfer efficiency in the width direction of the resin film only by discussing the diameter of air ejection holes and the number of rows of air ejection holes.

The conventional hole nozzles intended to improve the uniformity of heat transfer efficiency in the width direction of the resin film include a hole nozzle used as a device for cooling the resin film on a casting drum (see Patent Literature 3) and a hole nozzle used as a drying device of a printing machine or coating machine (see Patent Literature 4). However, these hole nozzles are effective in the case where the distance between the air ejection holes and the surface of the resin film is made shorter than 20 mm, and it is not preferred to use such hole nozzles in a tenter oven in which the distance between the air ejection holes and the surface of the resin film is generally 140 to 270 mm, since the heat transfer rate of the surface of the resin film may decline remarkably.

Patent Literature 1: JP 1634915 B
Patent Literature 2: JU 2528669 B
Patent Literature 3 JP 3374527 B
Patent Literature 4: JU 2008679 B

SUMMARY OF INVENTION

Technical Problem

One object of the invention is to solve the problems of the abovementioned prior art by providing an air injection nozzle good in the uniformity of heat transfer efficiency in the width direction of the resin film. Another object of the invention is to provide a tenter oven good in the uniformity of heat transfer efficiency in the width direction of the resin film using the air ejection nozzle of the invention.

Solution to Problem

An air ejection nozzle of the invention comprises:
(a) an air ejection nozzle which is provided against a passing plane of a resin film carrying one direction with a clearance and used for ejecting air toward a surface of the resin film, wherein
(b) the air ejection nozzle comprises a nozzle housing, and the nozzle housing has an air supply passage therein, an air ejection face facing the passing plane of the resin film, and many air ejection holes opening to the air supply passage and opening in the air ejection face respectively,
(c) a figure of each of openings of the many air ejection holes in the air ejection face is circle,
(d) the many air ejection holes are arranged in the air ejection face in two rows of a first row and a second row in the direction perpendicular to the carrying direction of the resin film, and a state of arrangement between the air ejection holes of the first row and the air ejection holes of the second row is a zigzag arrangement, and
(e) the distance L (mm) between the air ejection face and the passing plane of the resin film, the diameter D (mm) of the respective air ejection holes in the air ejection face, the interval Px (mm) in the carrying direction of the resin film between a first air ejection holes-aligned straight line passing through the centers of the multiple air ejection holes arranged in the first row and a second air ejection holes-aligned straight line passing through the centers of the multiple air ejection holes arranged in the second row, and each interval Py (mm) between the centers of the respectively adjacent air ejection holes in the first air ejection holes-aligned straight line and between the centers of the respectively adjacent air ejection holes in the second air ejection holes-aligned straight line satisfy the following formulae (1) and (2):

$$6 \leq (L/D)/(Px/Py) \leq 9 \quad \text{formula (1)}$$

$$4 \leq L/D \leq 8 \quad \text{formula (2)}$$

In the air ejection nozzle of the invention, it is preferred that the following formula (3) is satisfied:

$$12 \leq L/B \leq 30 \quad \text{formula (3)}$$

where $B = 2\pi(D/2)^2/Py$ (where $\pi$ is the ratio of the circumference of a circle to its diameter).

In the air ejection nozzle of the invention, it is preferred that the distance L is 140 to 270 mm.

A tenter oven of the invention comprising:
(a) an oven housing having an inlet of a resin film at one end thereof and an outlet of the resin film at the other end thereof,
(b) having a stretching zone between the inlet of the resin film and the outlet of the resin film, for stretching the resin film at least in the direction perpendicular to the carrying direction of the resin film while the resin film is carried from the inlet of the resin film toward the outlet of the resin film, and
(c) having a heat treatment zone between the inlet of the resin film and the outlet of the resin film, for ejecting air toward a surface of the resin film and heat treating the resin film, wherein
(d) the air ejection face of the air ejection nozzle of the invention is positioned to face a passing plane of the resin film formed between the inlet of the resin film and the outlet of the resin film, and
(e) the air ejection nozzle is provided in the heat treatment zone in such a manner that the directions of the first row and the second row of the air ejection holes of the air ejection nozzle are kept perpendicular to the carrying direction of the resin film.

In the tenter oven of the invention, it is preferred that the heat treatment zone includes a preheating zone, a stretching zone, a heat setting zone and a cooling zone in the order from the inlet of the resin film toward the outlet of the resin film, and the air ejection nozzle is provided at least in one of these zones.

In the tenter oven of the invention, the stretching zone may be a simultaneously biaxial stretching zone in which the resin film is stretched in the direction perpendicular to the carrying direction of the resin film and stretched in the carrying direction of the resin film.

In the tenter oven of the invention, it is preferred that the air ejection nozzle is provided on both sides of the passing plane of the resin film having a clearance formed against the passing plane of the resin film.

Advantageous Effects Invention

The air ejection nozzle of the invention has many air ejection holes having specific forms and arranged in a specific positional relationship. Therefore, if the air ejection nozzle is used for heat-treating a resin film, excellent uniformity of heat transfer efficiency in the width direction of the resin film can be obtained. Therefore, the tenter oven of the invention using the air ejection nozzle of the invention allows a production of a resin film having homogeneous heat-treated properties in the width direction.

REFERENCE SIGNS LIST

Figure 1:
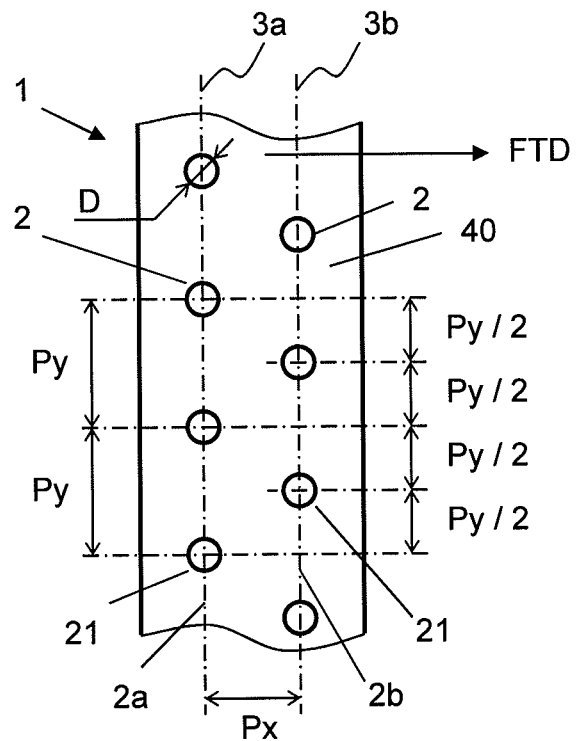
FIG. 1 is an enlarged plan view showing a portion of the air ejection face of an air ejection nozzle of the invention shown in FIG. 2.

| Reference Signs List | |
|---|---|
| 1 | air ejection nozzle |
| 1A | upper air ejection nozzle |
| 1Af, 1Bf | air ejection face |
| 1a | nozzle housing |
| 1B | lower air ejection nozzle |
| 2, 2A, 2B | air ejection hole |
| 2a | first row in the arrangement of air ejection holes |
| 2b | second row in the arrangement of air ejection holes |
| 3a | straight line passing through the centers of the air ejection holes arranged in first row (first air ejection holes-aligned straight line) |
| 3b | straight line passing through the centers of the air ejection holes arranged in second row (second air ejection holes-aligned straight line) |
| 4a | center line between air ejection nozzle 1 and air ejection nozzle 11a adjacent to the air ejection nozzle 1 on the upstream side in the resin film carrying direction |
| 4b | center line between air ejection nozzle 1 and air ejection nozzle 11b adjacent to the air ejection nozzle 1 on the downstream side in the resin film carrying direction |
| 5a | straight line passing through the centers of the air ejection holes arranged in the first row 2a and drawn in the resin film carrying direction |
| 5b | straight line passing through the center between straight line 5a and straight line 5c |
| 5c | straight line passing through the centers of the air ejection holes arranged in the second row 2b and drawn in the resin film carrying direction |
| 11a, 11b | air injection nozzle adjacent to air ejection nozzle 1 |
| 20 | air ejection plate |
| 21 | opening of air ejection hole |
| 31 | resin film |
| 31a | resin sheet |
| 31b | non-oriented film |
| 31c | monoaxially oriented film |
| 31b | biaxially oriented film |
| 31e | film as a product |
| 33 | heat transfer rate distribution on a surface of a resin film |
| 40, 40A | air ejection face |
| 41 | air supply passage |
| 41a, 41b | air introducing port |
| 51 | tenter oven |
| 51A | oven housing |
| 51a | inlet of resin film |
| 51b | outlet of resin film |
| 52A, 52B | heat exchanger |
| 53A, 53B | fan |
| 54 | suction duct |
| 54A, 54B | suction port |
| 61 | outside space of tenter oven |
| 62 | end boundary of analysis space |
| 71A, 71B | rail |
| 73A, 73B | clip |
| 91 | extruder |
| 92 | die |
| 93 | casting drum |
| 94 | longitudinal stretching machine |
| 95 | tenter apparatus |
| 96 | winding roll |
| 511 | preheating zone |
| 512 | stretching zone |
| 523 | heat setting zone |
| 514 | cooling zone |
| D | diameter of air ejection hole (opening of air ejection hole in air ejection face) |
| FTD | carrying direction of a resin film |
| FPf | passing plane of a resin film |
| HTC | magnitude indicator of heat transfer rate |
| HTCL | portion of large heat transfer rate |
| HTCS | portion of small heat transfer rate |
| L | distance between the air ejection face where air ejection holes are arranged and the passing plane of a resin film |
| Pn | section between center line 4a and center line 4b |
| Px | interval between straight line 3a and straight line 3b |
| Py | interval between the centers of respectively adjacent air ejection holes in the respective rows of first row 2a and second row 2b |
| Q | heat transfer efficiency of air ejection nozzle |
| Qa | average heat transfer efficiency of air ejection nozzle |
| Qmax | maximum value of heat transfer efficiency of air ejection nozzle |
| Qmin | minimum value of heat transfer efficiency of air ejection nozzle |
| Rq | heat transfer efficiency irregularity of air ejection nozzle in the width direction of a resin film |
| Rt | thickness irregularity in the width direction of a resin film |
| Ta | average value of thickness distributed in the width direction of a resin film |
| Tn | minimum value of thickness distributed in the width direction of a resin film |
| Tx | maximum value of thickness distributed in the width direction of a resin film |

Description of Embodiments

Known methods for producing a resin film include a melt film formation method and a solution film formation method. In these film formation methods, a molten resin or a resin solution is continuously extruded from a slit opening of a die, to form a cast sheet-like resin film. The obtained cast resin film is then stretched in the machine direction and/or in the transverse direction.

Below is explained an example in reference to drawings, in which an air ejection nozzle and a tenter oven of the invention are applied to a process for producing a biaxially oriented resin film to be obtained by stretching a cast resin film formed by the aforementioned melt film formation method in the machine direction and in the transverse direction.

Figure 7:
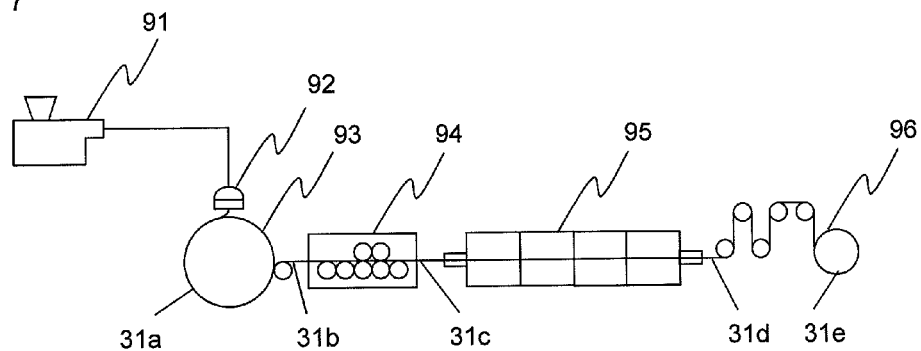
FIG. 7 is a schematic process chart for explaining an example of a resin film production process using a sequential biaxial stretching method.

FIG. 7 is a schematic process chart showing an example of a resin film production process using a sequential biaxial stretching method. In the sequential biaxial stretching method, a cast resin film is stretched at first in the machine direction, to obtain a monoaxially oriented resin film, and the obtained monoaxially oriented resin film is stretched in the transverse direction.

The resin film production process using a sequential biaxial stretching method is, as shown in FIG. 7, provided with an extruder 91, die 92, casting drum 93, longitudinal stretching machine 94, tenter apparatus 95 and winding roll 96.

A resin polymer is melted in the extruder 91 and extruded toward the die 92, being discharged as a sheet from the die 92. The resin sheet 31a discharged from the die 92 is cooled and solidified by the casting drum 93, to obtain a cast film 31b. Then, the cast film 31b is stretched by the longitudinal stretching machine 94 in the machine direction, namely, in the carrying direction, to obtain a monoaxially oriented film 31c. The obtained monoaxially oriented film 31c is stretched in the tenter apparatus 95 in the transverse direction, to obtain a biaxially oriented film 31d. Subsequently, the biaxially oriented film 31d is continuously wound around the winding roll 96, to obtain a film 31e as a rolled product. Hereinafter, the cast film 31b, monoaxially oriented film 31c or biaxially stretched film 31d may be called simply as a resin film 31.

In the case where a surface of the film as a product is required to be modified, the film may be coated on the surface with a desired coating liquid as the case may be. When the film is coated, the monoaxially stretched film 31c is coated on the surface immediately before the tenter apparatus 95 in the production process shown in FIG. 7.

A case of using a sequential biaxial stretching method has been explained. In the case where a simultaneous biaxial stretching method is used, the longitudinal stretching machine 94 is not used, and the cast film 31b cooled and solidified by the casting drum 93 is stretched in the tenter apparatus 95 simultaneously in the longitudinal direction (carrying direction) of the resin film and the width direction of the resin film, to obtain a biaxially oriented film.

The carrying direction of the resin film refers to the direction in which the continuous resin film runs continuously, namely, the longitudinal direction of the continuously running resin film, and in the production process of FIG. 7, the carrying direction refers to the direction in which the resin film runs from the extruder 91 toward the winding roll 96.

Figure 4:
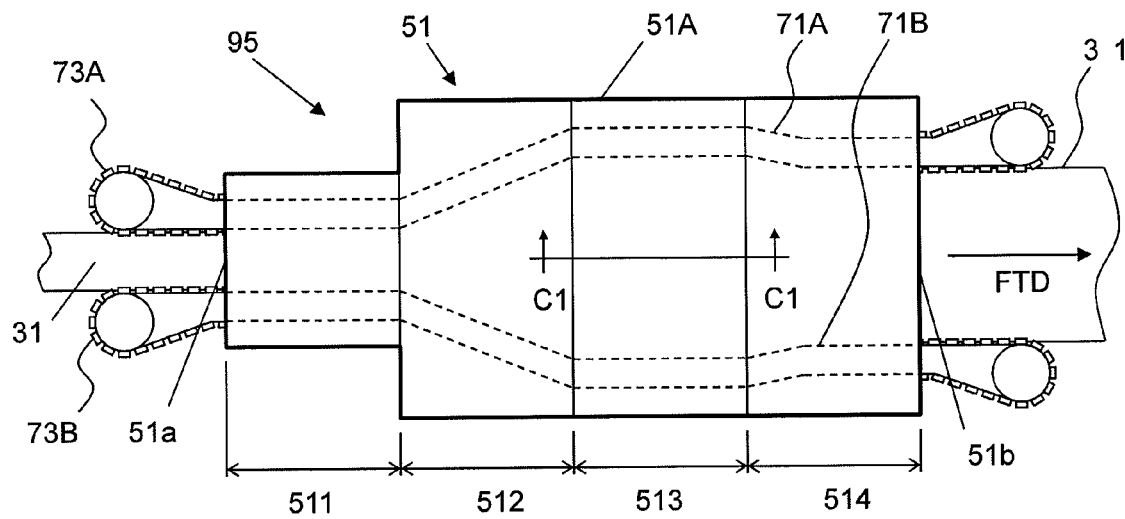
FIG. 4 is a plan view (top view) for explaining an example of a tenter apparatus.

FIG. 4 is a plan view (top view) showing an example of the tenter apparatus 95 shown in FIG. 7. In FIG. 4, the tenter apparatus 95 has rail 71A and rail 71B disposed in opposite to each other, numerous clips 73A and 73B running along the rails 71A and 71B, and a tenter oven 51 for ejecting the air controlled to a desired temperature to a surface of the rein film and collecting the ejected air for recycled use. The direction in which the resin film 31 is carried in the tenter oven 51 is indicated by arrow FTD. The tenter oven 51 comprises an oven housing 51A, and the oven housing 51A has a resin film inlet 51a at one end thereof and a resin film outlet 51b at the other end thereof.

The clips 73A and 73B hold both the edges of the resin film 31 at the resin film inlet 51a and pass through the tenter oven 51, releasing the resin film 31 at the resin film outlet 51b.

The tenter oven 51 has at least a stretching zone between the resin film inlet 51a and the resin film outlet 51b for stretching the resin film 31 in the direction perpendicular to the carrying direction FTD of the resin film 31 while the resin film 31 is carried from the resin film inlet 51a to the resin film outlet 51b. Further, the tenter oven 51 has heat treatment zones between the resin film inlet 51a and the resin film outlet 51b for ejecting air toward a surface of the resin film 31 for heat-treating the resin film.

In this example, the tenter oven 51 has four heat treatment zones including a preheating zone 511, a stretching zone 512, a heat setting zone 513 and a cooling zone 514 in the order from the upstream side to the downstream side in the carrying direction FTD of the resin film 31, and desired air temperatures can be set in the respective zones.

Each of the zones may also be further divided into multiple chambers in the carrying direction FTD of the resin film 31, so that the temperature of air can be set differently in the respective chambers. That is, the tenter oven 51 can also be constituted, for example, such that the preheating zone 511 has three chambers, that the stretching zone 512 has four chambers, that the heat setting zone 513 has two chambers and that the cooling zone 514 has one chamber. In this case, the temperatures of the respective chambers of each zone can also be independently set.

With regard to the air temperature ranges of the respective zones, in the case where the resin film 31 is, for example, a polyester film, it is preferred that the temperature of the preheating zone 511 is 80 to 140° C., that the temperature of the stretching zone 512 is 80 to 200° C., that the temperature of the heat setting zone 513 is 150 to 240° C. and that the cooling zone 514 is 50 to 200° C.

If the rails 71A and 71B are installed to be gradually wider in the relative distance between the rail 71A and the rail 71B (the gauge between the rail 71A and the rail 71B in the direction perpendicular to the carrying direction FTD of the resin film 31) in the stretching zone 512, the resin film 31 can be stretched in the width direction thereof (the direction perpendicular to the carrying direction FTD of the resin film 31). As required, if a section in which the relative distance between the rail 71A and the rail 71B becomes gradually narrow is established in the heat setting zone 513 or in the cooling zone 514, the resin film 31 can be treated to be relaxed in the width direction thereof.

In the case where a simultaneous biaxial stretching method is employed, in the stretching zone 512 of the tenter oven 51, the intervals between the respective clips 73A and the intervals between the respective clips 73B respectively running along the rails 71A and 71B are gradually widened. As a result, the resin film 31 can be stretched also in the carrying direction FTD, to allow simultaneous biaxial stretching.

Figure 5:
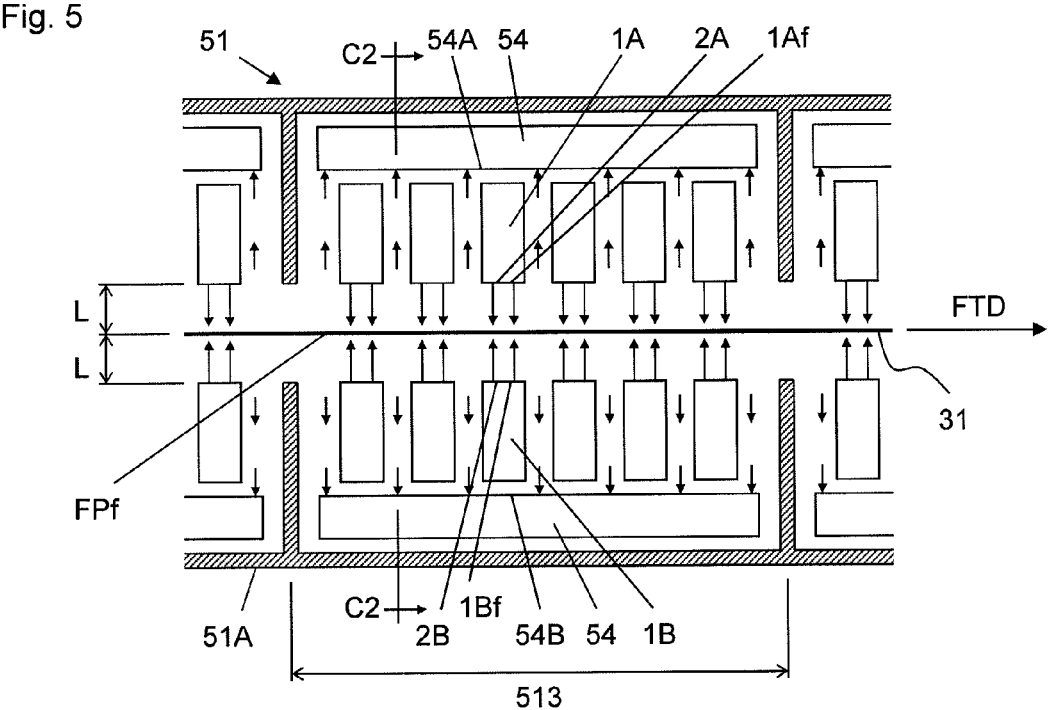
FIG. 5 is the C1-C1 sectional view of FIG. 4 in arrow direction.
Figure 6:
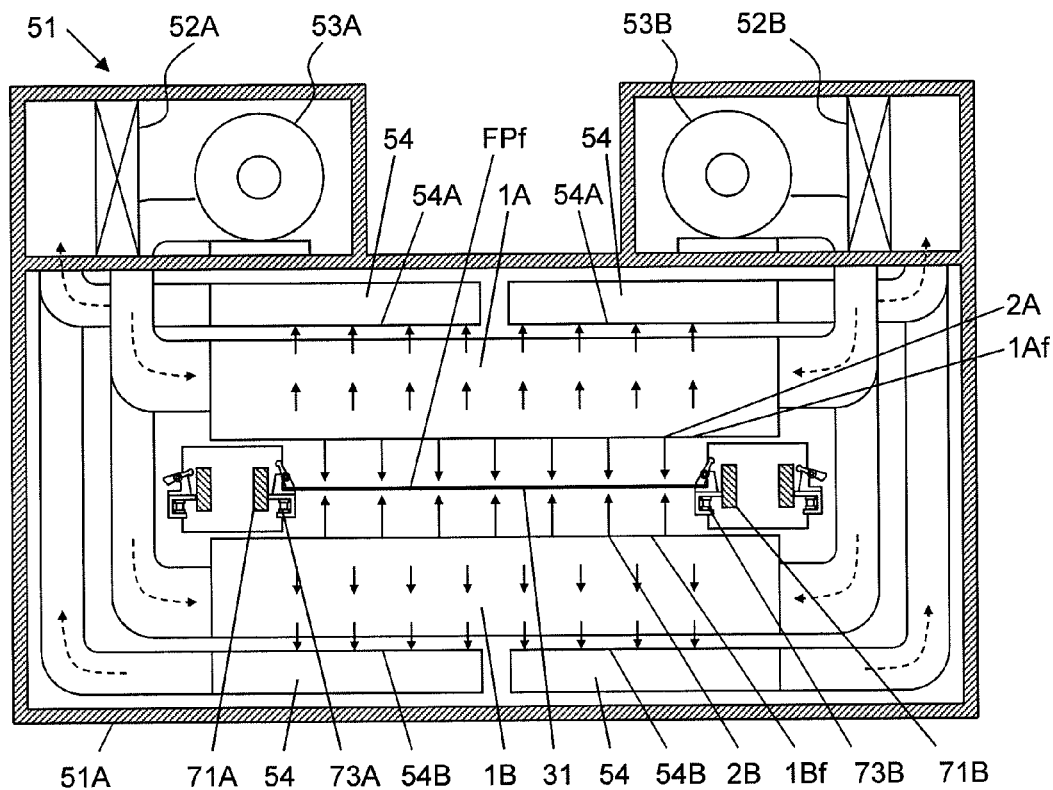
FIG. 6 is the C2-C2 sectional view of FIG. 5 in arrow direction.

FIG. 5 is the C1-C1 sectional view of FIG. 4 in the arrow direction. FIG. 6 is the C2-C2 sectional view of FIG. 5 in the arrow direction. The tenter oven 51 shown in FIG. 4 has multiple upper air ejection nozzles 1A installed at intervals in the carrying direction FTD of the resin film 31, to face the upper surface of the resin film 31 as shown in FIG. 5, and further has multiple lower air ejection nozzles 1B installed at intervals in the carrying direction FTD of the resin film 31, to face the lower surface of the resin film 31. In the heat setting zone 513 of FIG. 5, six upper air ejection nozzles and six lower air ejection nozzles are shown. As shown in FIG. 6, the respective upper air ejection nozzles 1A and the respective lower air ejection nozzles 1B are installed to extend in the width direction of the resin film 31 (the direction perpendicular to the carrying direction FTD).

On the top surface of the oven housing 51A of the tenter oven 51, heat exchangers 52A and 52B are installed. The air controlled to a desired temperature by the heat exchangers 52A and 52B is sent by fans 53A and 53B into the respective air ejection nozzles 1A and 1B, and discharged from the air ejection holes 2A and 2B formed in the faces (air ejection faces) 1Af and 1Bf of the air ejection nozzles 1A and 1B facing the surfaces of the resin film 31. The discharged air passes through the suction ports 54A and 54B in the tenter oven 51 and is collected into the heat exchangers 52A and 52B. The collected air is used in recycle in the tenter oven 51. Meanwhile, FIG. 5 shows the portion of the heat setting zone 513 in the tenter oven 51 of the tenter apparatus 95, but the same structure can be used also in other zones of the tenter oven 51 such as the preheating zone 511, stretching zone 512 and cooling zone 514.

The air ejection nozzle ejects air controlled at a desired temperature toward a surface of the resin film carried in one direction, acting to promote heat exchange between the air and the resin film. That is, in the case where the temperature of the resin film is lower than the temperature of the air ejected from the air ejection nozzle toward the surface of the resin film, the resin film is heated, and in the case where the temperature of the resin film is higher than the temperature of the air ejected from the air ejection nozzle toward the surface of the resin film, the resin film is cooled. Further, in the case where the temperature of the resin film is equal to the temperature of the air ejected from the air ejection nozzle toward the surface of the resin film, the resin film is heat-retained. Moreover, in the case where the resin film is coated on the surface with a coating liquid immediately before the tenter apparatus 95, the formed coating film is dried or cured by the heat exchange with the air ejected from the air ejection nozzle to the surface of the coating film.

The number of the air ejection nozzles in the resin film carrying direction can also be one in each zone, but considering the efficiency of heat exchange between the air and the resin film, it is preferred that at least three air ejection nozzles are used. Further, the air ejection nozzle can also be installed on one surface side only of the resin film, but considering the efficiency of heat exchange between the air and the resin film, it is preferred that the air ejection nozzles are installed on both the surface sides of the resin film.

Figure 2:
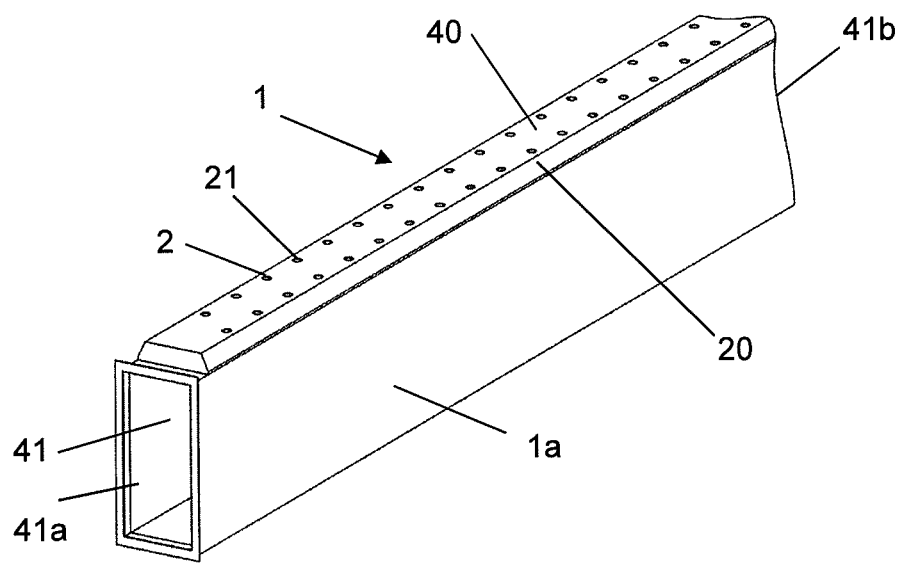
FIG. 2 is a perspective view showing an example of the air ejection nozzle of the invention.

FIG. 2 is a perspective view showing an example of the air ejection nozzle of this invention. In FIG. 2, the air ejection nozzle 1 comprises a nozzle housing 1a. The nozzle housing 1a has air introducing ports 41a and 41b for introducing air having a predetermined temperature into the nozzle housing 1a at both the ends thereof in the longitudinal direction, and the inside space between the air introducing port 41a and the air introducing port 41b forms an air supply passage 41.

Further, the nozzle housing 1a is mounted with an air ejection plate 20 on the top surface opening of the housing. The air ejection plate 20 has many air ejection holes 2 open on one side in the outside surface of the air ejection plate 20 and open on the other side in the inside surface of the air ejection plate 20, namely, open into the air supply passage 41. Therefore, the outside surface of the air ejection plate 20 forms an air ejection face 40 having many openings 21 of the air ejection holes 2. The air ejection nozzle 1 is used in such a manner that the air ejection face 40 thereof faces the surface of the resin film to be heat-treated, with a clearance formed between them.

FIG. 1 is an enlarged plan view showing a portion of the air ejection face 40 of the air ejection nozzle 1 of the invention shown in FIG. 2. In FIG. 1, the air ejection nozzle 1 has many air ejection holes 2 with openings 21 in the face of the air ejection nozzle 1 facing the surface of the resin film, namely, in the air ejection face 40. The form of the respective air ejection holes in the air ejection face 40, namely, the form of the respective openings 21 is circular. The diameter of the respective air ejection holes 2 in the air ejection face 40, namely, the diameter of the respective openings 21 is D (mm).

The many air ejection holes 2, namely, the many openings 21 are arranged in two rows consisting of the first row 2a and the second row 2b in the air ejection face 40. The direction of the first row 2a and the second row 2b is the direction perpendicular to the resin film carrying direction FTD (the width direction of the resin film). The first row 2a is positioned on the upstream side in the resin film carrying direction FTD, and the second row 2b is positioned on the downstream side in the resin film carrying direction FTD. The air ejection holes 2 arranged in the first row 2a and the air ejection holes 2 arranged in the second row 2b are arranged zigzag in the plan view.

In FIG. 1, the interval between a straight line 3a (a first air ejection holes-aligned straight line) passing through the centers of the air ejection holes 2 arranged in the first row 2a and a straight line 3b (a second air ejection holes-aligned straight line) passing through the centers of the air ejection holes 2 arranged in the second row 2b in the resin film carrying direction FTD is expressed as Px (mm). Further, each interval between the centers of the respectively adjacent air ejection holes 2 in the first row 2a and between the centers of the respectively adjacent air ejection holes 2 in the second row 2b is expressed as Py (mm).

In the abovementioned zigzag arrangement, it is preferred that the center of each air ejection hole 2 of the first row 2a shifts from the center of the air ejection hole 2 of the second row 2b nearest to the air ejection hole of the first row by Py/2 in the width direction of the resin film. However, the interval Py/2 between each air ejection hole of the first row and the air ejection hole of the second row nearest to the air ejection hole of the first row can also be a value within a range of Py/2±10%.

Figure 3:
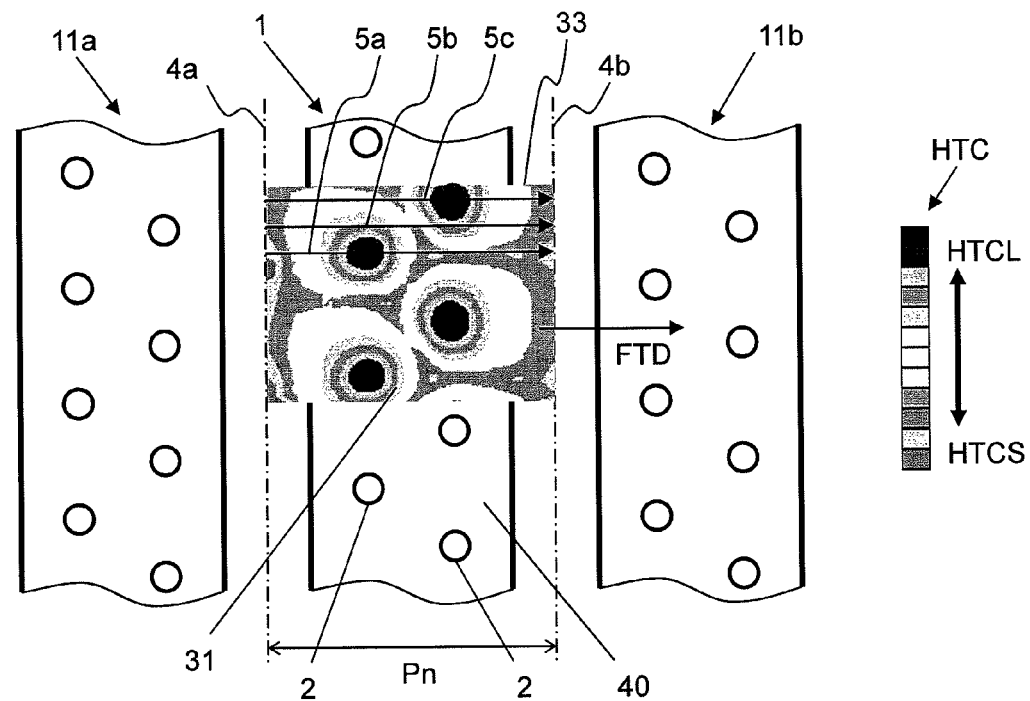
FIG. 3 is a plan view for explaining an example of the heat transfer rate distribution on a surface of a resin film.

FIG. 3 is a plan view showing a state of the heat transfer rate distribution 33 on a surface of a resin film obtained by the numerical analysis explained for the examples described later. The heat transfer rate in the heat transfer rate distribution 33 is largest at the central position of each air ejection hole 2 of the air ejection nozzle 1 and becomes smaller at a position farther away from the central position of the air ejection hole 2. The heat transfer efficiency of one air ejection nozzle 1 is the mean value of the heat transfer rates in the carrying direction FTD of the resin film 31 in a section Pn ranging from the center line 4a between the air ejection nozzle 1 and the air ejection nozzle 11a adjacent to the air ejection nozzle 1 on the upstream side in the resin film carrying direction to the center line 4b between the air ejection nozzle 1 and the air ejection nozzle 11b adjacent to the air ejection nozzle 1 on the downstream side in the resin film carrying direction. The center lines 4a and 4b, the straight line 3a (the first air ejection holes-aligned straight line) passing through the centers of the air ejection holes 2 of the first row 2a and the straight line 3b (the second air ejection holes-aligned straight line) passing through the centers of the air ejection holes 2 of the second row 2b are parallel to each other.

Straight lines 5a, 5b and 5c drawn in the resin film carrying direction FTD in FIG. 3 are explained below.

The straight line 5a is a line passing through the center of an air ejection hole 2 arranged in the first row 2a and the straight line 5c is a line passing through the center of an air ejection hole 2 arranged in the second row 2b. The straight line 5b is a line passing through the center of the interval between the straight line 5a and the straight line 5c.

Next, the history of the heat transfer rates occurring on the surface of the carried and moved resin film at the positions corresponding to these lines is explained below. The heat transfer rate on the surface portion of the resin film passing the position corresponding to the straight line 5a is large when the surface portion of the film passes over the first row 2a but is small when it passes over the second row 2b. The reason is that the straight line 5a passes the center of an air ejection hole 2 on the first row 2a but a position apart from the centers of air ejection holes 2 on the second row 2b, therefore that when the surface portion of the resin film corresponding to the straight line 5a passes over the first row 2a, it passes over the air ejection hole 2, hence the heat transfer rate being large, and that when the surface portion of the resin film passes over the second row 2b, it passes over a position apart from air ejection holes 2, hence the heat transfer rate being small.

The heat transfer rate on the surface portion of the resin film corresponding to the straight line 5c is small when the surface portion of the resin film passes over the first row 2a, but is large when it passes over the second row 2b. Likewise, the straight line 5c passes a position apart from air ejection holes 2 when it passes the first row 2a, and therefore when the surface portion of the resin film corresponding to the straight line 5c passes over the first row 2a, the heat transfer rate on the surface portion of the resin film becomes small, and when the surface portion of the resin film passes over the second row 2b, the heat transfer rate on the surface portion of the resin film becomes large since the surface portion of the resin film passes over the center of an air ejection hole 2 of the second row 2b.

The heat transfer rate on the surface portion of the resin film corresponding to the straight line 5b becomes medium when the surface portion of the resin film passes over the first row 2a and when it passes over the second row 2b. The reason is that when the straight line 5b passes the first row 2a, it is farther from an air ejection hole 2 than the straight line 5a and closer to an air ejection hole 2 than the straight line 5c, and further that when it passes the second row 2b, it is closer to an air ejection hole 2 than the straight line 5a and is farther away from an air ejection hole than the straight line 5c. The heat transfer efficiency of the air ejection nozzle 1 is the mean value of these heat transfer rates experienced.

In FIG. 3, the magnitudes in terms of the heat transfer rates of the resin film 31 are expressed by shades on the surface of the resin film 31. FIG. 3 shows indicator HTC for expressing the magnitude in terms of heat transfer rate. As the indicator HTC, dark HTCL means a portion having a large heat transfer rate, and light HTCS means a portion having a small heat transfer rate. If the color shades in the indicator HTC are compared with the color shade pattern shown on the surface of the resin film 31, the portions having high heat transfer rates and the portions having low heat transfer rates on the resin film 31 can be read.

If the air ejection nozzle 1 in which the air ejection holes 2 are arranged zigzag in two rows in the direction perpendicular to the resin film carrying direction is used, the heat transfer efficiency in the resin film portion corresponding to the straight line 5a is almost equal to the heat transfer efficiency in the resin film portion corresponding to the straight line 5c, needless to say. The air ejection holes arranged like this allow the difference between the heat transfer efficiency in the resin film portions corresponding to the straight lines 5a and 5c, and the heat transfer efficiency in the resin film portion corresponding to the straight line 5b to be decreased. Compared with the case where the air ejection holes 2 are arranged in one row only in the resin film carrying direction, the uniformity of heat transfer efficiency in the width direction of the resin film can be improved.

However, even if the air ejection holes 2 are arranged zigzag in two rows in the direction perpendicular to the resin film carrying direction, the uniformity of heat transfer efficiency is not satisfactorily enough. For further decreasing the difference between the heat transfer efficiency in the portions corresponding to the straight lines 5a and 5c and the heat transfer efficiency in the portion corresponding to the straight line 5b, it is important to select the dimensions of the portions explained below as factors affecting the heat transfer rate distribution 33 in good balance.

It is necessary that the air ejection nozzle 1 of the invention satisfies the following formulae (1) and (2), where L (mm) is the distance between the air ejection holes 2 and the passing plane of the resin film 31; D (mm) is the diameter of the air ejection holes 2 in the air ejection face 40; Px (mm) is the interval between the straight line 3a (the first air ejection holes-aligned straight line) passing through the centers of the air ejection holes 2 of the first row 2a and the straight line 3b (the second air ejection holes-aligned straight line) passing through the centers of the air ejection holes 2 of the second row 2b; and Py (mm) is each interval between the centers of the respectively adjacent air ejection holes 2 in each row in the width direction of the resin film.

$$6 \leq (L/D)/(Px/Py) \leq 9 \quad \text{formula (1)}$$

$$4 \leq L/D \leq 8 \quad \text{formula (2)}$$

In the above, the passing plane FPf of the resin film 31 refers to the geometrical plane passing through the positions where the respective clips 73A and 73B existing in the tenter oven 51 hold the resin film 31.

Further, it is preferred that the cross sectional form of the air ejection holes 2 is closer to a geometric circle but is not required to be completely round. Therefore, the diameter D is defined as the diameter of the circle obtained by least square approximation of the air ejection holes 2. It is preferred that the circularity tolerance of the air ejection holes 2 is within ±5% of diameter D.

The formula (1) is explained below. If the value of Px/Py as the denominator of formula (1) is diminished, a state of arrangement of the air ejection holes 2 approaches to a state of arrangement in one row under at intervals of Py/2 in the width direction of the resin film 31. Therefore, the heat transfer efficiency of the air ejection nozzle at the position corresponding to the straight line 5b declines. On the contrary, if the value of Px/Py is enlarged, the heat transfer efficiency of the air ejection nozzles at the position corresponding to the straight line 5b becomes larger than the heat transfer efficiency of the air ejection nozzle at the positions corresponding to the straight line 5a and the straight line 5c. Therefore, among the values of Px/Py, there is a range where the difference between the heat transfer efficiency of the air ejection nozzle at the positions corresponding to the straight line 5a and the straight line 5c and the heat transfer efficiency of the air ejection nozzle at the position corresponding to the straight line 5b becomes small.

The inventors found that the range where the difference between the heat transfer efficiency at the positions corresponding to the straight lines 5a and 5c and the heat transfer efficiency at the position corresponding to the straight line 5b becomes small depends on the value of L/D. That is, if the value of L/D is diminished, the region where the heat transfer rate is large is widened, and the heat transfer efficiency of the air ejection nozzle at the position corresponding to the straight line 5b becomes smaller than the heat transfer efficiency of the air ejection nozzle at the positions corresponding to the straight line 5a and the straight line 5c. Therefore, it is preferred that the value of Px/Py is made smaller. On the contrary, if the value of L/D is enlarged, the region where the heat transfer rate is large is narrowed, and the heat transfer efficiency of the air ejection nozzle at the position corresponding to the straight line 5b becomes larger than the heat transfer efficiency of the air ejection nozzle at the positions corresponding to the straight line 5a and the straight line 5c. Therefore, it is preferred that the value of Px/Py is made larger. The preferred relationship between the value of L/D and the value of Px/Py was discussed by the method shown in the examples, and as a result, it was found that in the case where the value of (L/D)/(Px/Py) was in a range from 6 to 9, the uniformity of heat transfer efficiency of the air ejection nozzle in the width direction of the resin film could be greatly improved.

Further, in the examples, it was found preferred that the value of (L/D)/(Px/Py) was in a range from 6 to 9, but it was found that the uniformity of the heat transfer efficiency of the air ejection nozzle in the width direction of the resin film could be further improved when the value of (L/D)/(Px/Py) was in a range from 7 to 8.

Also in the case where the air ejection holes are arranged in 4 rows or larger even-numbered rows in the resin film carrying direction, the air ejection nozzle satisfying the formula (1) can be designed, but in this case, since the dimension of the air ejection nozzle in the resin film carrying direction becomes large, the flow of air into the suction ports in the tenter oven is inhibited while the dimension of the tenter oven in the resin film carrying direction becomes large. Therefore, such an air ejection nozzle has problems in view of practicality.

Next, the formula (2) is explained below. Based on the numerous studies concerning free jet and impact jet, it is well known that the structure of a flow field formed by a jet can be expressed by L/D. According to these studies, when the value of L/D is in a range from 6 to 8, a potential region where the air velocity at the center of a jet maintains an initial air velocity exists, but if the value of L/D is larger than 10, the turbulence of the jet perfectly develops. If the turbulence of a jet develops, velocity variation becomes large to destabilize the jet, and a pressure difference and pressure variation may exist around the jet. In this case, the flow field is likely to be disturbed. The potential core region is strong in the capability to flow rectilinearly and is unlikely to be disturbed by pressure difference or pressure variation. Therefore, it is preferred that the value of VD is 8 or less, and more preferred is 6 or less.

Further, it is known that a jet more apart from its air ejection hole entrains the surrounding air more, to spread the mixing region in the radial direction of the air ejection hole. If the value of VD is too small, the spread of the mixing region is insufficient, and the jet colliding with the surface of the resin film is like a spot, not allowing the effect explained for the formula (1) to be obtained. Therefore, it is preferred that the value of L/D is 4 or more. As a result of discussion performed by using the method shown in the examples, it was confirmed that an VD value of 5 or more is more preferred. Therefore, it is preferred that the value of VD is 4 to 8. A range from 5 to 8 is more preferred, and a range from 5 to 6 is further more preferred.

Further, in the air ejection nozzle of the invention, if $B = 2\pi (D/2)^2/Py$ (where $\pi$ is the ratio of the circumference of a circle to its diameter), then it is preferred that the following formula (3) is satisfied.

$$12 \leq L/B \leq 30 \quad \text{formula (3)}$$

The formula (3) is explained below. B is a hole clearance per unit width of the air ejection nozzle. The hole clearance per unit width refers to a clearance of a rectangular air ejection hole (slit) in the case where the air ejection holes 2 circular in cross sectional form are converted into the rectangular air ejection hole (slit) continuous in the width direction of the resin film and having an opening area equal to that of the circular air ejection holes 2. If the value of B is too small for the value of L, the heat transfer efficiency may decline as the case may be. The air ejection velocity (air velocity) of the air ejection nozzle used in a tenter oven depends on the thickness and carrying speed of the resin film, but it is preferred that the air ejection velocity is set in a range from 5 to 35 m/s.

The air velocity can be set in a wide range. At an air ejection velocity of 20 m/s, it is preferred that the heat transfer efficiency of the air ejection nozzle is 55 W/(m²K) or more. For this purpose, it is preferred that the value of L/B is 30 or less, and 24 or less is more preferred. Further, if the value of B is too large for the value of L, the amount of circulated air increases to require a heat exchanger and a fan respectively larger in capacity, thus raising the equipment cost and the power cost. Therefore, it is preferred that the value of L/B is 12 or more, and 15 or more is more preferred.

The value of L is not especially limited, but it is preferred that the value of L is in the range of 140 mm to 270 mm. If the value of L is less than 140 mm, it may be difficult to secure the space in which the clips used for carrying the resin film pass. If the value of L is more than 270 mm, a heat exchanger and a fan respectively large in capacity are required for obtaining the necessary heat transfer efficiency, to raise the equipment cost and the power cost.

The value of D is not especially limited either. However, in view of the abovementioned preferred ranges of L/D and L, it is preferred that the value of D is in the range of L/8 to L/5, and in the range of L/6 to L/5 is more preferred.

The value of Px is not especially limited, but it is preferred that the value of Px is in the range of 50 mm to 180 mm. In the range of 70 mm to 150 mm is more preferred. If the value of Px is too small, being less than 50 mm, the jets of the air ejection holes adjacent to each other interfere with each other and may be bent or shaken. If the value of Px is too large, being more than 180 mm, the dimension of the air ejection nozzle in the resin film carrying direction becomes large. Therefore, the flow into the suction ports is inhibited, and the dimension of the tenter oven in the resin film carrying direction may become large. It is preferred that the value of Px is in the range of 50 mm to 180 mm.

The value of Py is not especially limited, but it is preferred that the value of Py is in the range of 50 mm to 200 mm. A more preferred range is 70 mm to 180 mm. If the Py value is too small, being less than 50 mm, the jets of the air ejection holes adjacent to each other may interfere with each other and may be bent or shaken. If the Py value is too large, being more than 200 mm, the jets colliding with the surface of the resin film are like spots, not allowing the effect explained for the formula (1) to be obtained as the case may be. Therefore, it is preferred that the Py value is in the range of 50 mm to 200 mm.

The resin film to be heat-treated by the air ejection nozzle or the tenter oven of the invention is not especially limited. The resin film can be, for example, a polyester film, polypropylene film, polyamide film, polylactic acid film, polyolefin film or polyphenylene sulfide film.

The tenter oven of the invention in which the air ejection nozzle of the invention is installed at least in any one of the zones of a preheating zone, stretching zone, heat setting zone and cooling zone preferably allows the production of any of the above-mentioned various films uniform in heat treatment effect, especially uniform in the heat treatment effect in the width direction.

In the tenter oven of the invention, it is preferred that the air ejection nozzle of the invention is installed at least in the preheating zone. Further, it is more preferred that the air ejection nozzle of the invention is installed not only in the preheating zone but also in any one zone of the stretching zone, heat setting zone and cooling zone. It is further more preferred that the air ejection nozzle of the invention is installed in all the zones of the preheating zone, stretching zone, heat setting zone and cooling zone.

The air ejection nozzle and tenter oven of the invention are explained below on the basis of examples.

Figure 8:
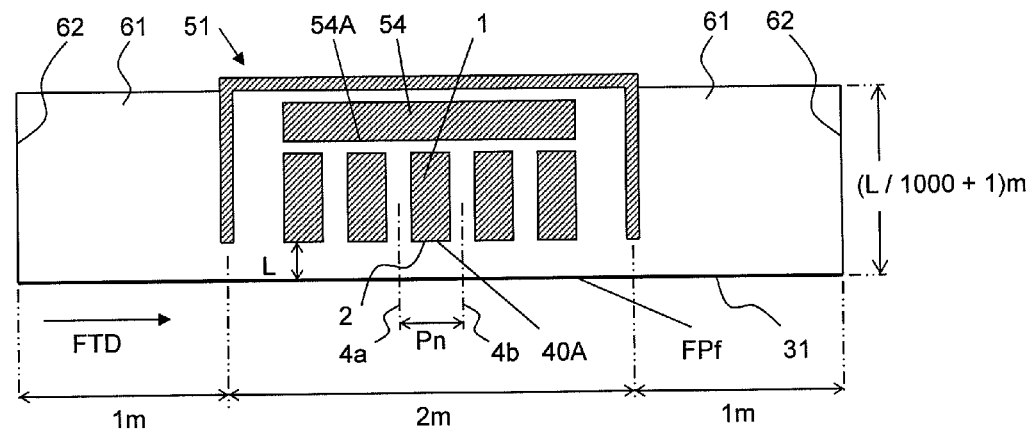
FIG. 8 is a sectional view of an analysis model for explaining an example of the analysis model used for calculating the heat transfer rate distribution on a surface of a resin film.

The example of the heat transfer rate distribution 33 on the surface of a resin film 31 shown in FIG. 3 was obtained by three-dimensional computational fluid analysis. FIG. 8 is a sectional view of the analysis model of a tenter oven 51 used in the examples of the invention, showing the plane perpendicular to the surface of a resin film 31 including the carrying direction FTD of the resin film 31. This analysis model drawing shows the upper half of a vertical structure symmetric with respect to the plane of the resin film 31.

In FIG. 8, with regard to the size of the tenter oven 51, the length of the tenter oven 51 in the carrying direction FTD of the resin film 31 was 2 m, and the length of the tenter oven 51 in the width direction of the resin film 31 was 2 m, and the height of the tenter oven 51 from the resin film 31 to the upper inner wall face of the tenter oven 51 was (L/1,000+1) m, where L is the distance between the air ejection face and the passing plane of the resin film defined before.

The outside spaces 61 of the tenter oven 51 were added in order that the end boundaries 62 of the analysis space do not affect the flow field in the tenter oven 51, and do not affect the constitution of the tenter oven 51. The end boundaries 62 of the analysis space are pressure boundaries, and as the boundary condition, atmospheric pressure (0.1 MPa) was set. With regard to the size of the outside spaces 61, the length of the outside spaces 61 in the carrying direction FTD of the resin film 31 was 1 m, and the length of the outside spaces 61 in the width direction of the resin film 31 was 2 m equal to the length (width) 2 m (not shown in the drawing) of the tenter oven 51 in the direction perpendicular to the carrying direction FTD of the resin film 31, and the height of the outside spaces 61 was (L/1,000+1) m equal to the height of the tenter oven 51.

The resin film 31 was modeled as a wall boundary moving at a speed of 1 m/s. The length of the resin film 31 in the width direction was 1 m, and the center of the resin film 31 in the width direction was positioned at the center of the tenter oven 51 in the width direction. That is, the center of the tenter oven 51 in the width direction of the resin film 31 is made to agree with the center of the resin film 31 in the width direction. Further, since the resin film 31 was carried continuously in the carrying direction FTD, the resin film 31 was positioned to be continuous from one end to the other end of the analysis model.

The tenter oven 51 was constituted such that five air ejection nozzles 1 were disposed on the side above the resin film 31.

With regard to the size of the air ejection nozzles 1, the length of each air ejection nozzle 1 in the carrying direction of the resin film 31 was 200 mm, and the length of each air ejection nozzle 1 in the width direction of the resin film was 1,400 mm, and the height of each air ejection nozzle 1 was 600 mm, and the center of each air ejection nozzle 1 in the direction perpendicular to the carrying direction FTD of the resin film 31 was positioned at the center of the tenter oven 51 in the width direction. That is, the center of the tenter oven 51 in the width direction of the resin film 31 is made to agree with the center of each air ejection nozzle 1 in the width direction of the resin film 31.

Further, among the five air ejection nozzles 1, the air ejection nozzle 1 positioned at the center (the third air ejection nozzle 1 on the upstream side in the carrying direction of the resin film 31) was positioned at the center of the tenter oven 51 in the carrying direction. That is, the center of the air ejection nozzle 1 positioned at the center in the carrying direction FTD of the resin film 31 is made to agree with the center of the tenter oven 51 in the carrying direction FTD of the resin film 31. Further, each interval Pn between the center lines between the air ejection nozzles 1 adjacent to each other in the carrying direction of the resin film 31 was 300 mm. Therefore, every interval between the respectively adjacent air ejection nozzles 1 is 100 mm.

In the faces of the air ejection nozzles 1 facing the resin film 31 (air ejection faces 40A), many circular air ejection holes 2 having diameter D (mm) were provided. The distance between the passing plane FPf of the resin film 31 and the air ejection faces 40A was L (mm). The air ejection holes 2 were modeled as an inflow boundary, and as the boundary condition, an air flow velocity of 20 m/s was set.

The air ejection holes 2 were arranged, as shown in FIG. 1, in two rows of first row 2a and second row 2b in the direction perpendicular to the carrying direction FTD of the resin film 31, and the air ejection holes 2 of the first row 2a and the air ejection holes 2 of the second row 2b were arranged zigzag in the plan view. The interval between the straight line 3a (the first air ejection holes-aligned straight line) passing through the centers of the air ejection holes 2 arranged in the first row 2a extending in the width direction of the resin film 31 and the straight line 3b (the second air ejection holes-aligned straight line) passing through the centers of the air ejection holes 2 arranged in the second row 2b extending in the width direction of the resin film 31 was expressed as Px (mm), and each interval between the centers of the air ejection holes 2 adjacent to each other in each row in the width direction of the resin film 31 was expressed as Py (mm).

The suction port 54A was modeled as an outflow boundary, and as the boundary condition, an outflow amount equal to the inflow amount from all the air ejection holes 2 was set. With regard to the size of the suction port 54A, the length of the suction port 54A in the carrying direction FTD of the resin film 31 was 1,400 mm, and the length of the suction port 54A in the width direction of the resin film 31 was 1,400 mm, and the suction port 54A was disposed above the air ejection nozzles 1. The distance between the suction port 54A and the faces (top faces) of the air ejection nozzles 1 opposite to the air ejection faces 40A was 100 mm. The height of the suction duct 54 provided with the suction port 54A was 200 mm, and the face as a whole of the suction duct 54 facing the air ejection nozzles 1 was formed as the suction port 54A. Further, the suction port 54A was disposed at the center in the width direction of the tenter oven 51 and the center in the carrying direction FTD of the resin film 31. That is, the center of the suction port 54A in the width direction of the resin film 31 is made to agree with the center of the tenter oven 51 in the width direction of the resin film 31, and the center of the suction port 54A in the carrying direction FTD of the resin film 31 is made to agree with the center of the tenter oven 51 in the carrying direction FTD of the resin film 31.

With regard to the physical properties of the fluid, dry air of atmospheric pressure at a temperature of 100° C. was assumed to have a density of 0.93 kg/m$^3$, a viscosity of $2.2×10^{-5}$ Pa·s, a specific heat of 1,012 J/(kg·K) and a heat conductivity of 0.031 W/(m·K).

For analysis, commercially available general purpose hot fluid analysis software, "STAR-CD (produced by CD-adapco Japan Co., Ltd.) was used to perform steady calculation. For handling turbulent flow, a k–ε turbulent flow model was used, and for handling a turbulent flow boundary layer near a wall, a wall law was used.

The abovementioned software is intended to analyze the Navier-Stokes Equation as a fluid motion equation by a finite volume method. Of course, any other hot fluid analysis software can also be used if similar analysis can be performed.

The heat transfer efficiency refers to the mean value of the heat transfer rates which the resin film 31 receives when it passes the air ejection nozzles 1. That is, the heat transfer efficiency of one air ejection nozzle 1 is the mean value in the carrying direction FTD of the resin film 31, of the heat transfer rates of the surface of the resin film 31 in the section Pn between the center line 4a with the adjacent air ejection nozzle 11a and the center line 4b with the adjacent air ejection nozzle 11b. Since the five air ejection nozzles installed side by side in the carrying direction FTD of the resin film 31 were identical in the arrangement of the air ejection holes 2, the heat transfer efficiency was calculated with the central one air ejection nozzle 1 as a representative of the respective air ejection nozzles.

EXAMPLE 1

Figure 9:
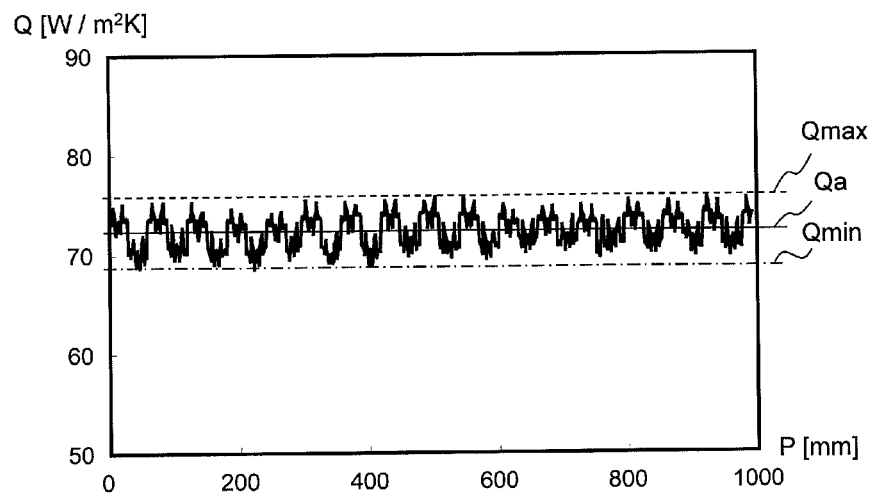
FIG. 9 is a chart for explaining the heat transfer efficiency distribution of an air ejection nozzle in the width direction of a resin film.

With L=150 mm, D=25 mm, Px=100 mm and Py=122 mm, the abovementioned analysis was performed. FIG. 9 is a chart showing the state of the heat transfer efficiency distribution of the air ejection nozzle 1 in the width direction of the film 31. In the chart, the position P (in mm) in the width direction of the resin film 31 is chosen as the abscissa, and the heat transfer efficiency Q (in $W/m^2K$) of the air ejection nozzle 1, as the ordinate. This chart was used to evaluate the following two items.

(1) Average Heat Transfer Efficiency Qa of Air Ejection Nozzle 1:

The mean value of the heat transfer efficiency values of the air ejection nozzle 1 distributed in the width direction of the resin film 31 is defined as the average heat transfer efficiency Qa (in $W/m^2K$) of the air ejection nozzle 1. It is preferred that the average heat transfer efficiency Qa is larger. In the invention, like the indicator of a general tenter oven, it was evaluated that the object of the invention was achieved and that the air ejection nozzle was acceptable in the case where the value of the average heat transfer efficiency Qa was 55 $W/m^2K$ or more.

(2) Heat Transfer Efficiency Irregularity Rq of Air Ejection Nozzle 1 in the Width Direction of Resin Film 31:

The value obtained by dividing the difference between the maximum value Qmax and the minimum value Qmin of the heat transfer efficiency Q of the air injection nozzle 1 in the width direction of the resin film 31 by the average heat transfer efficiency Qa and multiplying the quotient by 100 was defined as the heat transfer efficiency irregularity Rq (in %) of the air ejection nozzle 1 in the width direction of the resin film 31. In FIG. 9, the maximum value of heat transfer efficiency Q is indicated by dotted line Qmax, the minimum value of heat transfer efficiency Q, by dotted line Qmin, and the mean value of heat transfer efficiency Q (average heat transfer efficiency Qa), by solid line Qa. It is preferred that the heat transfer efficiency irregularity Rq is smaller. In the invention, since the heat transfer efficiency irregularity Rq of a general slit nozzle is 5 to 15%, it was evaluated that the object of the invention was achieved and that the air ejection nozzle was acceptable in the case where the value of the heat transfer efficiency irregularity Rq was 15% or less.

The evaluation results of Example 1 were Qa=72.0 $W/m^2K$ and Rq=10.9%, showing that both the average heat transfer efficiency Qa and the heat transfer efficiency irregularity Rq were acceptable.

EXAMPLES 2 to 15 and COMPARATIVE EXAMPLES 1 to 13

L, D, Px and Py were changed with the value of L/D kept in a range from 5 to 8, to perform the abovementioned analysis as described for Example 1. The values of L, D, Px and Py used for analysis and the values of average heat transfer efficiency Qa and the values of heat transfer efficiency irregularity Rq evaluated are shown in Table 1.

In Examples 2 to 15 in which the value of (L/D)/(Px/Py) was kept in a range from 6 to 9, the values of average heat transfer efficiency Qa were 55 $W/m^2K$ or more and the values of heat transfer efficiency irregularity Rq were 15% or less, showing that the results of the respective examples were acceptable.

In Comparative Examples 1 to 13 in which the value of (L/D)/(Px/Py) was smaller than 6 or larger than 9, the values of average heat transfer efficiency Qa were 55 $W/m^2K$ or more, but the values of heat transfer efficiency irregularity Rq were larger than 15%, showing that the results of the respective comparative examples were not acceptable, namely, were rejected.

COMPARATIVE EXAMPLES 14 to 17

With L=270 mm, D=30 mm and Py=88 mm, the value of Px was changed in a range from 80 to 140 mm, to perform the abovementioned analysis as described for Example 1. The values of L, D, Px and Py used for analysis, and the values of average heat transfer efficiency Qa and the values of heat transfer efficiency irregularity Rq evaluated are shown in Table 1.

In Comparative Examples 14 to 17 in which the value of L/D was 9, the values of average heat transfer efficiency Qa were 55 $W/m^2K$ or more, but the values of heat transfer efficiency irregularity Rq were larger than 15%, showing that the respective comparative examples were not acceptable, namely, were rejected.

TABLE 1

|  | L [mm] | D [mm] | Px [mm] | Py [mm] | B [mm] | L/B | L/D | Px/Py | (L/D)/ (Px/Py) | Qa [$W/m^2K$] | Rq [%] |
|---|---|---|---|---|---|---|---|---|---|---|---|
| Comparative example 1 | 150 | 25 | 80 | 122 | 8.0 | 18.6 | 6.0 | 0.7 | 9.2 | 69.6 | 18.3 |
| Example 1 | 150 | 25 | 100 | 122 | 8.0 | 18.6 | 6.0 | 0.8 | 7.3 | 72.0 | 10.9 |
| Example 2 | 150 | 25 | 120 | 122 | 8.0 | 18.6 | 6.0 | 1.0 | 6.1 | 71.3 | 13.3 |
| Comparative example 2 | 150 | 25 | 140 | 122 | 8.0 | 18.6 | 6.0 | 1.1 | 5.2 | 69.0 | 23.1 |

TABLE 1-continued

|  | L [mm] | D [mm] | Px [mm] | Py [mm] | B [mm] | L/B | L/D | Px/Py | (L/D)/ (Px/Py) | Qa [W/m²K] | Rq [%] |
|---|---|---|---|---|---|---|---|---|---|---|---|
| Comparative example 3 | 150 | 30 | 80 | 176 | 8.0 | 18.7 | 5.0 | 0.5 | 11.0 | 69.8 | 22.2 |
| Example 3 | 150 | 30 | 100 | 176 | 8.0 | 18.7 | 5.0 | 0.6 | 8.8 | 72.9 | 9.5 |
| Example 4 | 150 | 30 | 120 | 176 | 8.0 | 18.7 | 5.0 | 0.7 | 7.3 | 74.3 | 7.1 |
| Example 5 | 150 | 30 | 140 | 176 | 8.0 | 18.7 | 5.0 | 0.8 | 6.3 | 73.5 | 10.0 |
| Comparative example 4 | 180 | 25 | 80 | 108 | 9.1 | 19.8 | 7.2 | 0.7 | 9.7 | 66.7 | 20.7 |
| Example 6 | 180 | 25 | 100 | 108 | 9.1 | 19.8 | 7.2 | 0.9 | 7.8 | 69.6 | 12.4 |
| Example 7 | 180 | 25 | 120 | 108 | 9.1 | 19.8 | 7.2 | 1.1 | 6.5 | 69.1 | 14.1 |
| Comparative example 5 | 180 | 25 | 140 | 108 | 9.1 | 19.8 | 7.2 | 1.3 | 5.6 | 66.5 | 17.6 |
| Comparative example 6 | 180 | 30 | 80 | 156 | 9.1 | 19.9 | 6.0 | 0.5 | 11.7 | 65.9 | 23.6 |
| Comparative example 7 | 180 | 30 | 100 | 156 | 9.1 | 19.9 | 6.0 | 0.6 | 9.4 | 69.8 | 16.8 |
| Example 8 | 180 | 30 | 120 | 156 | 9.1 | 19.9 | 6.0 | 0.8 | 7.8 | 71.4 | 9.4 |
| Example 9 | 180 | 30 | 140 | 156 | 9.1 | 19.9 | 6.0 | 0.9 | 6.7 | 71.0 | 10.0 |
| Comparative example 8 | 240 | 30 | 80 | 100 | 14.1 | 17.0 | 8.0 | 0.8 | 10.0 | 65.1 | 24.8 |
| Example 10 | 240 | 30 | 100 | 100 | 14.1 | 17.0 | 8.0 | 1.0 | 8.0 | 69.2 | 11.3 |
| Example 11 | 240 | 30 | 120 | 100 | 14.1 | 17.0 | 8.0 | 1.2 | 6.7 | 69.4 | 11.9 |
| Comparative example 9 | 240 | 30 | 140 | 100 | 14.1 | 17.0 | 8.0 | 1.4 | 5.7 | 67.6 | 21.0 |
| Comparative example 10 | 240 | 35 | 80 | 136 | 14.1 | 17.0 | 6.9 | 0.6 | 11.7 | 66.9 | 26.3 |
| Comparative example 11 | 240 | 35 | 100 | 136 | 14.1 | 17.0 | 6.9 | 0.7 | 9.3 | 67.5 | 17.7 |
| Example 12 | 240 | 35 | 120 | 136 | 14.1 | 17.0 | 6.9 | 0.9 | 7.8 | 71.9 | 7.4 |
| Example 13 | 240 | 35 | 140 | 136 | 14.1 | 17.0 | 6.9 | 1.0 | 6.7 | 71.8 | 8.2 |
| Comparative example 14 | 270 | 30 | 80 | 88 | 16.1 | 16.8 | 9.0 | 0.9 | 9.9 | 61.5 | 19.5 |
| Comparative example 15 | 270 | 30 | 100 | 88 | 16.1 | 16.8 | 9.0 | 1.1 | 7.9 | 59.7 | 21.1 |
| Comparative example 16 | 270 | 30 | 120 | 88 | 16.1 | 16.8 | 9.0 | 1.4 | 6.6 | 61.8 | 19.1 |
| Comparative example 17 | 270 | 30 | 140 | 88 | 16.1 | 16.8 | 9.0 | 1.6 | 5.7 | 59.7 | 22.1 |
| Comparative example 12 | 270 | 35 | 80 | 120 | 16.0 | 16.8 | 7.7 | 0.7 | 11.6 | 65.8 | 25.2 |
| Comparative example 13 | 270 | 35 | 100 | 120 | 16.0 | 16.8 | 7.7 | 0.8 | 9.3 | 66.9 | 15.6 |
| Example 14 | 270 | 35 | 120 | 120 | 16.0 | 16.8 | 7.7 | 1.0 | 7.7 | 70.2 | 11.7 |
| Example 15 | 270 | 35 | 140 | 120 | 16.0 | 16.8 | 7.7 | 1.2 | 6.6 | 69.9 | 12.5 |

Figure 10:
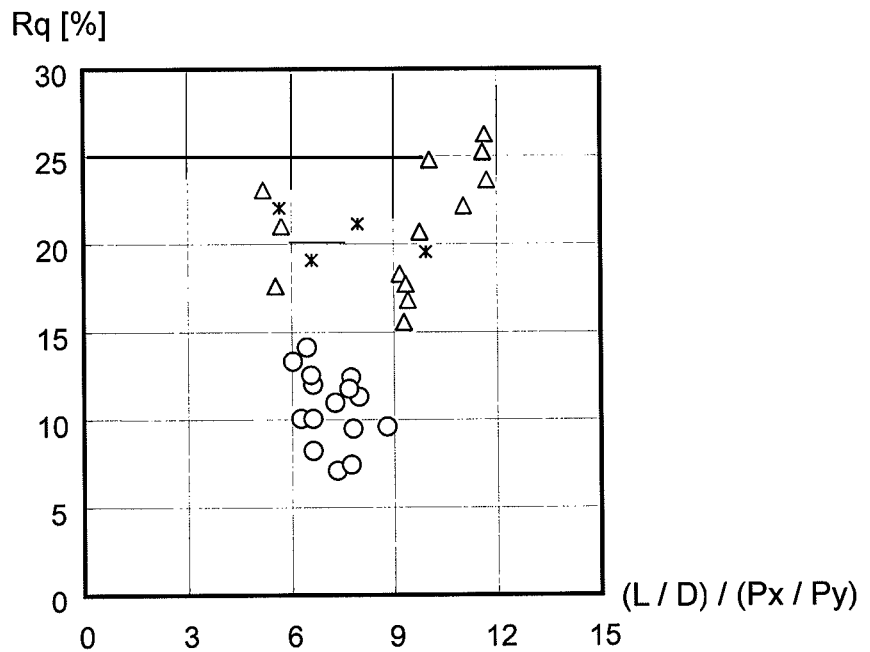
FIG. 10 is a graph obtained by plotting the values of (L/D)/(Px/Py) and the values of heat transfer efficiency irregularity Rp obtained in examples and comparative examples of the invention.

FIG. 10 is a graph in which the values of (L/D)/(Px/Py) used and the values of heat transfer efficiency irregularity Rq obtained in Examples 1 to 15 and Comparative Examples 1 to 17 are plotted. In the graph of FIG. 10, the value of (L/D)/(Px/Py) is chosen as the abscissa, and the value of heat transfer efficiency irregularity Rq (%), as the ordinate. Circles indicate the values of Examples 1 to 15, triangles, the values of Comparative Examples 1 to 13, and crosses, the values of Comparative Examples 14 to 17.

From the graph of FIG. 10, it can be seen that as the value of (L/D)/(Px/Py) becomes smaller than 6, the value of heat transfer efficiency irregularity Rq becomes suddenly large. Further, it can be seen that as the value of (L/D)/(Px/Py) becomes larger than 9, the value of heat transfer efficiency irregularity Rq becomes suddenly large. Furthermore in Comparative Examples 14 to 17 where the value of L/D is 9, it can be seen that even though the value of (L/D)/(Px/Py) is kept in a range from 6 to 9, the value of heat transfer efficiency irregularity Rq does not become small.

Figure 11:
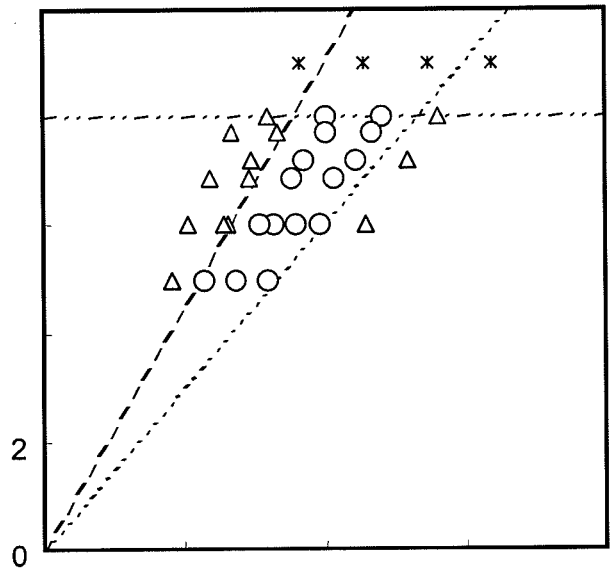
FIG. 11 is a graph obtained by plotting the values of Px/Py and the values of L/D obtained in examples and comparative examples of the invention.

FIG. 11 is a graph in which the values of Px/Py and the values of L/D in Examples 1 to 15 and Comparative Examples 1 to 17 are plotted. In the graph of FIG. 11, the value of Px/Py is chosen as the abscissa, and the value of L/D, as the ordinate. Circles indicate the values of Examples 1 to 15, triangles, the values of Comparative Examples 1 to 13, and crosses, the values of Comparative Examples 14 to 17. Further, dotted line L6 indicates the line of (L/D)/(Px/Py)=6, dotted line L9, line of (L/D)/(Px/Py)=9, and dotted line L8, line of L/D=8.

From the graph of FIG. 11, it can be seen that in Examples 1 to 15 in which the values of heat transfer efficiency irregularity Rq are small, the values of (L/D)/(Px/Py) are kept in a range from 6 to 9 while the values of L/D are kept in a range from 5 to 8.

EXAMPLE 16

An air ejection nozzle 1 having the same dimensions as those of Example 1 was installed in the preheating zone of the tenter apparatus 95 shown in FIG. 4, and the production process shown in FIG. 7 was used to produce a biaxially oriented polyethylene terephthalate resin film 31d.
Production Conditions:

Chips of polyethylene terephthalate dried in vacuum at a temperature of 180° C. were supplied into the extruder 91, and the resin melted at a temperature of 280° C. was extruded, being discharged as a sheet from the die 92, to obtain a resin sheet 31a. The resin sheet 31a was wound around the casting drum 93 with a surface temperature of 20° C., to be cooled and solidified, for obtaining a cast film 31b. In succession, the cast film 31b was introduced into the longitudinal stretching machine 94, heated by rolls heated to a temperature of 80° C., further stretched to 3.2 times in the carrying direction while being heated by an infrared heater, and cooled by a cooling roll with a temperature of 40° C., to obtain a monoaxially oriented film 31c. In succession, the monoaxially oriented film 31c was introduced into the tenter apparatus 95, heated to a temperature of 100° C. in the preheating zone, stretched to 3.5 times in the width direction while being heated to a temperature of 110° C. in the stretching zone, heated to a temperature of 220° C. in the heat setting zone, and cooled to a temperature of 90° C. in the cooling zone while being treated for relaxation by 5% in the width direction, to obtain a biaxially oriented film 31d. Then, both the edges of the biaxially stretched film 31d were off, and the film was wound around the winding roll 96, to obtain a film 31e having a width of 3,400 mm as a product.

Thickness Measuring Method:

From the film 31e wound as a product around the winding roll 96, a sample having a size of 3,400 nm in the width direction and 30 mm in the carrying direction was obtained by cutting, and the thickness values of the sample film distributed in the width direction were measured using Film Thickness Tester "KG601A" and Electronic Micrometer "K306C" respectively produced by Anritsu K. K. The thickness irregularity Rt (in %) in the width direction was obtained from relational expression Rt=(Tx−Tn)/Ta×100[%], wherein Ta is the mean thickness value (in µm); Tn, the minimum thickness value (in µm); and Tx, the maximum thickness value (in µm).

Figure 12:
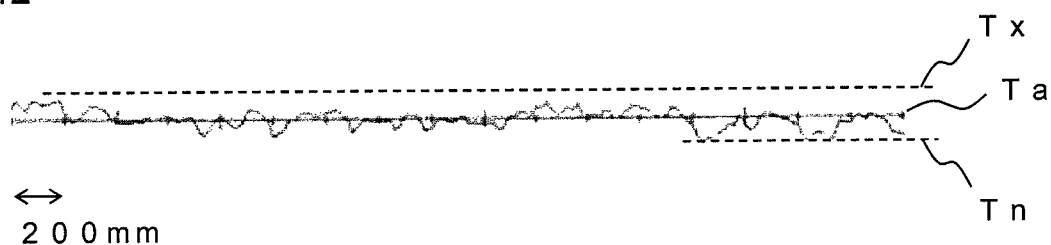
FIG. 12 is a graph showing the thickness distribution in the width direction of the resin film in Example 16 of the invention.

The thickness values distributed in the width direction of the film 31e as a product of Example 16 are shown in the graph of FIG. 12. In the graph of FIG. 12, the position (mm) in the width direction is chosen as the abscissa, and the thickness value, as the ordinate. Solid line Ta indicates the mean thickness value, dotted line Tx, the maximum thickness value, and dotted line Tn, the minimum thickness value. The results of Example 16 were Ta=74.9 µm, Tn=74.3 µm, Tx=75.5 µm and Rt=1.6%.

COMPARATIVE EXAMPLE 18

An air ejection nozzle 1 having the same dimensions as those of Comparative Example 1 was installed in the preheating zone of the tenter apparatus 95 shown in FIG. 4, and a biaxially stretched polyethylene terephthalate resin film 31d (film 31e as a product) was produced under the same conditions as described for Example 16. The thickness values were measured according to the same method as that of Example 16.

Figure 13:
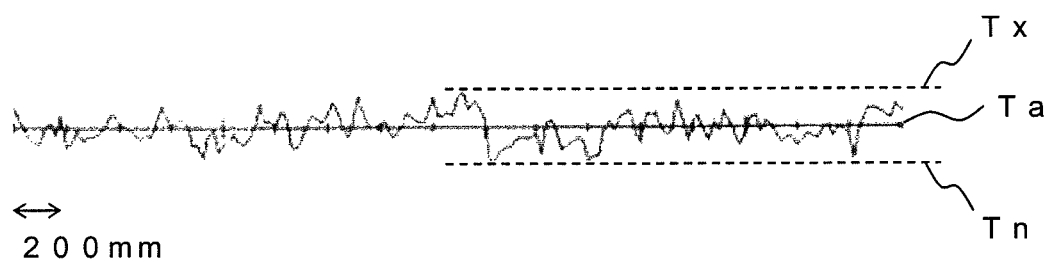
FIG. 13 is a graph showing the thickness distribution in the width direction of the resin film in Comparative Example 18 of the invention.

The thickness values distributed in the width direction of the film 31e as the product of Comparative Example 18 are shown in the graph of FIG. 13. In the graph of FIG. 13, the position (mm) in the width direction is chosen as the abscissa, and the thickness value, as the ordinate. Solid line Ta indicates the mean thickness value, dotted line Tx, the maximum thickness value, and dotted line Tn, the minimum thickness value. The results of Comparative Example 18 were Ta=75.1 µM, Tn=74.1 µm, Tx=76.0 µm and Rt=2.5%.

If the heat transfer efficiency irregularity Rq of the air ejection nozzle 1 is large, the temperature irregularity of the resin film 31 after passing through the preheating zone becomes large, to cause stretching irregularity in the stretching zone, thus enlarging the thickness irregularity Rt in the width direction. Since the value of heat transfer efficiency irregularity Rq in Example 16 is very smaller than the value of the heat transfer efficiency irregularity Rq in Comparative Example 18, the air ejection nozzle 1 of Example 16 is good in the uniformity of heat transfer efficiency in the width direction of the resin film.

INDUSTRIAL APPLICABILITY

Since the air ejection nozzle of the invention has specifically formed many air ejection holes arranged in a specific relationship, the resin film heat-treated using the air ejection nozzle is excellently uniform in the heat transfer efficiency in the width direction of the resin film. Therefore, the tenter oven of the invention using the air ejection nozzle of the invention allows the production of a resin film having homogeneous heat-treated properties in the width direction. The air ejection nozzle of the invention can be used not only for a tenter oven but also as a drying device used in a printing machine or coating machine, etc.

The invention claimed is:

1. A tenter oven comprising:
(a) an oven housing having an inlet for a resin film at one end thereof and an outlet for the resin film at the other end,
(b) a stretching zone between the inlet and the outlet, wherein the resin film is stretched at least in a direction perpendicular to the direction in which the resin film is carried while the resin film is carried from the inlet toward the outlet, and
(c) a heat treatment zone between the inlet and the outlet, wherein air is ejected toward a surface of the resin film and the resin film is heat treated, wherein
(d-1) an air ejection nozzle is provided against a passing plane of the resin film with a clearance and ejects air toward the surface of the resin film,
(d-2) the air ejection nozzle comprises a nozzle housing, and the nozzle housing has an air supply passage therein, an air ejection face facing the passing plane of the resin film, and many air ejection holes opening to the air supply passage and opening in the air ejection face respectively,
(d-3) the many air ejection holes in the air ejection face are circular,
(d-4) the many air ejection holes are arranged in the air ejection face in two rows including a first row and a second row in the direction perpendicular to the carrying direction of the resin film, with the air ejection holes of the first row and the air ejection holes of the second row being arranged in a zigzag arrangement, and
(d-5) the distance L (mm) between the air ejection face and the passing plane of the resin film, the diameter D (mm) of the respective air ejection holes in the air ejection face, the interval Px (mm) in the carrying direction of the resin film between first air ejection holes aligned in a straight line passing through the centers of the multiple air ejection holes arranged in the first row and second air ejection holes aligned in a straight line passing through the centers of the multiple air ejection holes arranged in the second row, and each interval Py (mm) between the centers of the respectively adjacent air ejection holes in the first air ejection holes aligned straight line and between the centers of the respectively adjacent air ejection holes in the second air ejection holes aligned straight line satisfy the following formulae (1) and (2):

$$6 \leq (L/D)/(Px/Py) \leq 9 \quad \text{formula (1)}$$

$$4 \leq L/D \leq 8 \quad \text{formula (2)}$$

(d-6) an air ejection face of the air ejection nozzle is positioned to face the passing plane of the resin film formed between the inlet and the outlet, and
(e) the air ejection nozzle is provided in the heat treatment zone in such a manner that the directions of the first row and the second row of the air ejection holes of the air ejection nozzle are kept perpendicular to the carrying direction of the resin film.

2. The tenter oven according to claim 1, wherein said air ejection nozzle satisfies the following formula (3):

$$12L/B \leq 30 \qquad \text{formula (3)}$$

wherein $B=2\pi(D/2)^2/Py$ wherein $\pi$ is the ratio of the circumference of a circle to its diameter.

3. The tenter oven according to claim 2, wherein the heat treatment zone includes a preheating zone, a stretching zone, a heat setting zone and a cooling zone in the order from the inlet of the resin film toward the outlet of the resin film; and the air ejection nozzle is provided at least in one of these zones.

4. The tenter oven according to claim 2, wherein the stretching zone is a simultaneous biaxial stretching zone in which the resin film is stretched in the direction perpendicular to the carrying direction of the resin film and stretched in the carrying direction of the resin film.

5. The tenter oven according to claim 2, wherein the air ejection nozzle is provided on both sides of the passing plane of the resin film having a clearance formed against the passing plane of the resin film.

6. The tenter oven according to claim 1, wherein the distance L is 140 to 270 mm.

7. The tenter oven according to claim 6, wherein the heat treatment zone includes a preheating zone, a stretching zone, a heat setting zone and a cooling zone in the order from the inlet of the resin film toward the outlet of the resin film; and the air ejection nozzle is provided at least in one of these zones.

8. The tenter oven according to claim 6, wherein the stretching zone is a simultaneous biaxial stretching zone in which the resin film is stretched in the direction perpendicular to the carrying direction of the resin film and stretched in the carrying direction of the resin film.

9. The tenter oven according to claim 6, wherein the air ejection nozzle is provided on both sides of the passing plane of the resin film having a clearance formed against the passing plane of the resin film.

10. The tenter oven according to claim 1, wherein the heat treatment zone includes a preheating zone, a stretching zone, a heat setting zone and a cooling zone in the order from the inlet of the resin film toward the outlet of the resin film; and the air ejection nozzle is provided at least in one of these zones.

11. The tenter oven according to claim 1, wherein the stretching zone is a simultaneous biaxial stretching zone in which the resin film is stretched in the direction perpendicular to the carrying direction of the resin film and stretched in the carrying direction of the resin film.

12. The tenter oven according to claim 1, wherein the air ejection nozzle is provided on both sides of the passing plane of the resin film having a clearance formed against the passing plane of the resin film.

* * * * *